US007664004B2

(12) United States Patent
Shindo

(10) Patent No.: US 7,664,004 B2
(45) Date of Patent: Feb. 16, 2010

(54) OPTICAL PICKUP APPARATUS

(75) Inventor: Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 349 days.

(21) Appl. No.: 11/757,095

(22) Filed: Jun. 1, 2007

(65) Prior Publication Data

US 2008/0049585 A1 Feb. 28, 2008

(30) Foreign Application Priority Data

Jun. 5, 2006 (JP) ............................ 2006-156483

(51) Int. Cl.
*G11B 7/00* (2006.01)

(52) U.S. Cl. ........................... 369/112.23; 369/112.02; 369/112.01; 369/44.23; 369/44.32

(58) Field of Classification Search ...................... None
See application file for complete search history.

(56) References Cited

U.S. PATENT DOCUMENTS

2004/0213131 A1* 10/2004 Kimura et al. ......... 369/112.03
2005/0276297 A1* 12/2005 Nishi et al. .............. 372/43.01
2007/0177481 A1* 8/2007 Kimura et al. ......... 369/112.01

FOREIGN PATENT DOCUMENTS

JP 10-134400 5/1998

* cited by examiner

*Primary Examiner*—Muhammad N. Edun
(74) *Attorney, Agent, or Firm*—Fish & Richardson P.C.

(57) ABSTRACT

An optical pickup apparatus comprising: an objective lens configured to apply a laser beam for recording or reproducing information to a plurality of layers of information recording surfaces selectively, the plurality of layers of information recording surfaces being included in an optical disc mounted on a turn table; and a spherical aberration correction lens configured to be movable on a light path on the side where the laser beam is incident on the objective lens, so as to correct spherical aberration when the laser beam is applied from the objective lens to any one of the plurality of information recording surfaces in the optical disc, a distance between the spherical aberration correction lens and the objective lens on each light path when the laser beam is focused on each of the plurality of layers of information recording surfaces in the optical disc with movement of the spherical aberration correction lens, including a distance at which optical magnification of an optical system including the spherical aberration correction lens and the objective lens is maintained substantially constant.

8 Claims, 7 Drawing Sheets

OPTICAL PICKUP APPARATUS

CROSS-REFERENCE TO RELATED APPLICATION

This application claims the benefit of priority to Japanese Patent Application No. 2006-156483, filed Jun. 5, 2006, of which full contents are incorporated herein by reference.

BACKGROUND OF THE INVENTION

1. Field of the Invention

The present invention relates to an optical pickup apparatus that can record information on and reproduce information from an optical disc including a plurality of layers of information recording surfaces.

2. Description of the Related Art

Optical pickup apparatuses are known, which can record information on and reproduce information from an optical disc including a plurality of layers of information recording surfaces. Specifically, this pickup apparatus includes two lenses which are an objective lens and a spherical aberration correction lens. The objective lens is a lens for applying the laser beam for recording or reproducing information to a plurality of layers of information recording surfaces, selectively, where the surfaces are included in an optical disc mounted on a turn table. The spherical aberration correction lens is a lens capable of moving on a light path between the objective lens and a light source of the laser beam to correct spherical aberration that may occur on application of the laser beam to any one of information recording surfaces from the objective lens.

For example, a description will be given with respect to an example of a spherical aberration correction in the case of focusing the laser beam on each of two layers (L0 and L1 layers) of the information recording surfaces in an optical disc such as Blu-ray Disc (registered trademark), etc., where it is assumed that a collimator lens, e.g., is used for the spherical aberration correction lens.

First, an arrangement for an optical system configured with the objective lens, the collimator lens, and a blue-violet semiconductor laser is set such that the spherical aberration becomes zero when a parallel laser beam (parallel light) generated by the blue-violet semiconductor laser and the collimator lens is focused, through the objective lens, on a virtual layer (Lm layer) located midway between the two layers of the optical disc.

In order to focus the laser beam on an L0 layer that is a layer with a thicker protective layer between the two layers, a diverging laser beam (divergent light) is generated by the blue-violet semiconductor laser and the collimator lens to enter the objective lens. Specifically, in the optical system for achieving focus on the above Lm layer, the spherical aberration can be made zero by moving the collimator lens away from the objective lens toward the blue-violet semiconductor laser along the light axis direction for a predetermined distance.

In order to focus the laser beam on an L1 layer that is a layer with a thinner protective layer between the two layers, a converging laser beam (convergent light) is generated by the blue-violet semiconductor laser and the collimator lens to enter the objective lens. Specifically, in the optical system for achieving focus on the above Lm layer, the spherical aberration can be made zero by moving the collimator lens toward the objective lens away from the blue-violet semiconductor laser along the light axis direction for a predetermined distance.

In general, in the case of an optical disc having a plurality of layers of information recording surfaces, again, the spherical aberration when the laser beam is focused on the information recording surface of each layer, can be made substantially zero by moving the collimator lens to change the degree of divergence of the laser beam incident on the objective lens. That is, to so-called multilayer optical discs, a well-known method is applicable, which is used for correcting spherical aberration depending on a difference in thickness of the protective layer between CD (Compact Disc) and DVD (Digital Versatile Disc), for example (see, e.g., Japanese Patent Application Laid-Open Publication No. 10-134400).

In general, when an arrangement of any lens is changed in an optical system configured with a plurality of lenses, the optical magnification of the optical system may change.

On the other hand, the optical magnification is considered to have a quantitative correlation with a rim intensity, where the rim intensity determines: the spot shape of the laser beam at the focal point; the optical coupling efficiency (e.g., a ratio of an amount of light incident on the objective lens out of an amount of light emitted from the blue-violet semiconductor laser) of the laser beam; and the like. The optical magnification represents, for example, a proportion of a size of an "image" at the focal point of the laser beam from the objective lens relative to a size of an "object" at the emitting point of the blue-violet semiconductor laser in the optical system. The rim intensity represents sharpness of intensity distribution on the cross section orthogonal to the light axis direction of the laser beam (e.g., sharpness increases as the rim intensity decreases).

For example, if the above spherical aberration correction is performed for each of the two layers (L0 and L1 layers) of the information recording surfaces in the optical disc, the optical magnification in the case of focusing the laser beam on the L0 layer generally becomes different from the optical magnification in the case of focusing the laser beam on the L1 layer, due to the displacement of the collimator lens. Characteristics of recording or reproducing information therefore become different between in the L0 layer and in L1 layer, which necessitates the inclusion of a configuration capable of accommodating the characteristic differences in a processing circuit, firmware, etc., for recording or reproducing information, of the optical pickup apparatus. Specifically, for example, it is necessary that the emitting power of the blue-violet semiconductor laser, the recording pulse waveform for recording information, and the like are adapted to be switchable between the L0 and L1 layers. This may cause an increase in complexity and costs in the optical pickup apparatus.

The optical magnification is also considered to have a correlation with the stability of the tracking control exercised by a differential push-pull method. The differential push-pull method is a method by which the tracking control is exercised: through the application of 0th order light to a track that is a target of recording or reproducing information in the optical disc; and at the same time, through the point-symmetrical application of +1st order and −1st order diffracted lights with respect to the 0th order light, wherein the 0th order light and the ±1st order diffracted lights are obtained by diffracting the laser beam with a diffraction grating, etc. The intervals among three spots composed of once spot formed by the 0th order light and of two spots formed around the track by the ±1st order diffracted lights, are varied depending on the optical magnification.

For example, if the above spherical aberration correction is performed for each of the two layers (L0 and L1 layers) of the information recording surfaces in the optical disc, the optical magnification in the case of focusing the laser beam on the L0 layer generally becomes different from the optical magnification in the case of focusing the laser beam on the L1 layer, due to the displacement of the collimator lens. The intervals among the three spots therefore become different between in the L0 layer and in the L1 layer, which may cause the variations in the amplitude of the tracking error signal between the two layers, resulting in the instability of the tracking control.

Therefore an object of the present invention is to provide a low-cost optical pickup apparatus capable of performing easily spherical aberration correction while maintaining characteristics of information recording or reproducing and stability of the tracking control substantially constant, for each of a plurality of layers of information recording surfaces in an optical disc.

SUMMARY OF THE INVENTION

An optical pickup apparatus according to an aspect of the present invention, comprises: an objective lens configured to apply a laser beam for recording or reproducing information to a plurality of layers of information recording surfaces selectively, the plurality of layers of information recording surfaces being included in an optical disc mounted on a turn table; and a spherical aberration correction lens configured to be movable on a light path on the side where the laser beam is incident on the objective lens, so as to correct spherical aberration when the laser beam is applied from the objective lens to any one of the plurality of information recording surfaces in the optical disc, a distance between the spherical aberration correction lens and the objective lens on each light path when the laser beams is focused on each of the plurality of layers of information recording surfaces in the optical disc with movement of the spherical aberration correction lens, including a distance at which optical magnification of an optical system including the spherical aberration correction lens and the objective lens is maintained substantially constant.

The features of the present invention will become apparent from the accompanying drawings and the content of the description.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of the description and the accompanying drawings, at least the following details will become apparent.

==Configuration Example of Optical Pickup Apparatus==

Figure 1:
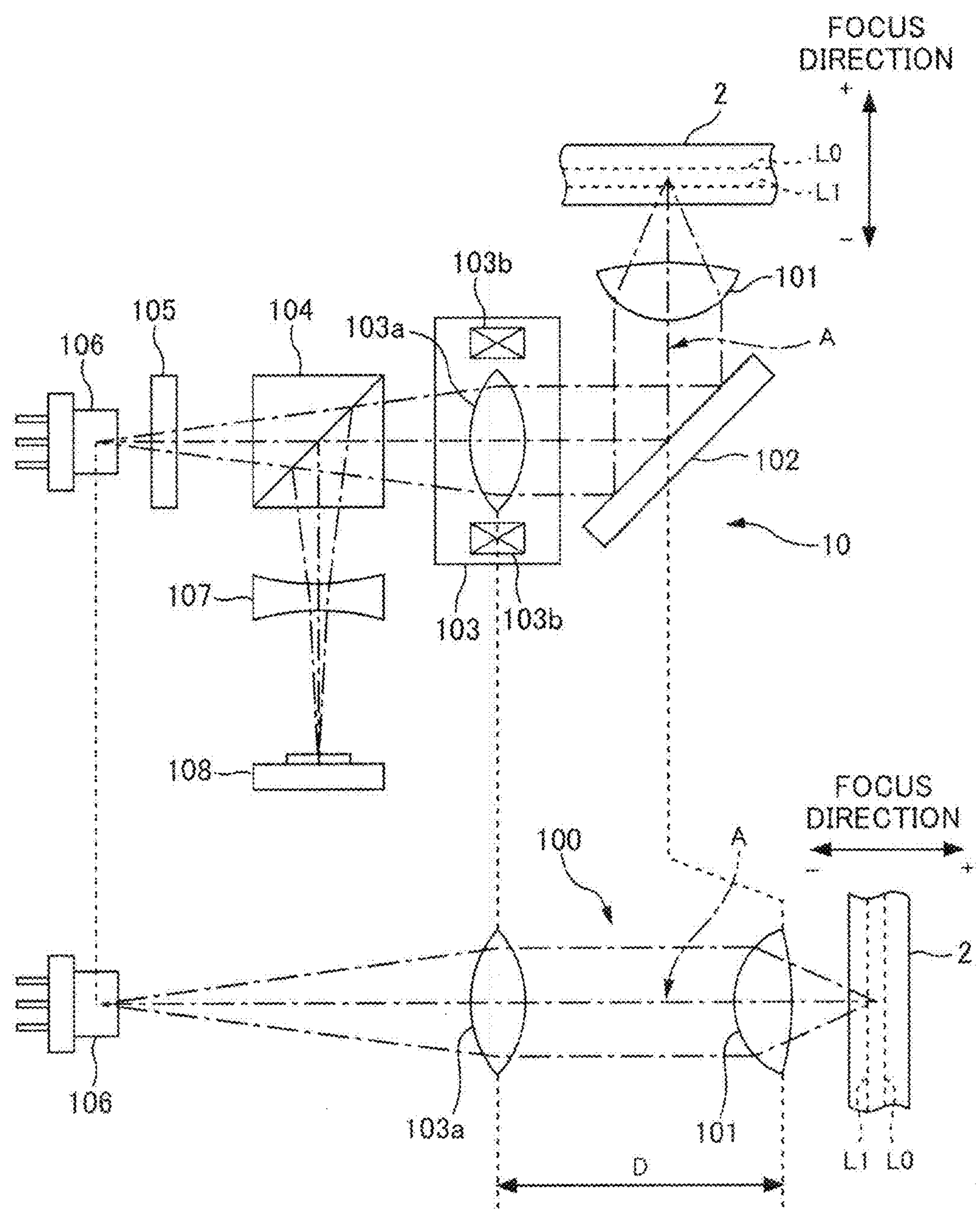
FIG. 1 is a side view of a configuration example of an optical pickup apparatus of an embodiment.
Figure 2:
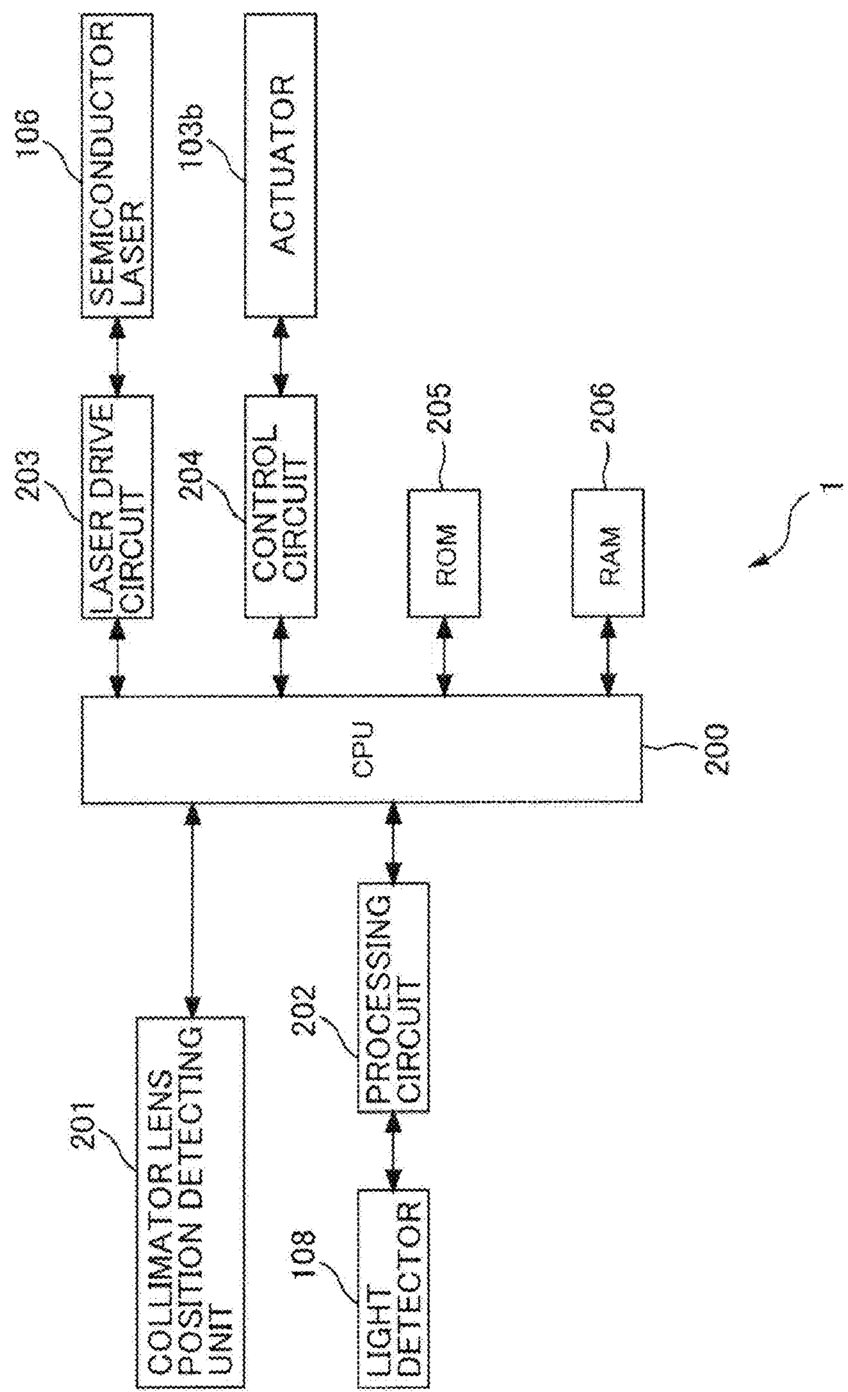
FIG. 2 is a block diagram of a configuration example of an optical disc recording/reproducing apparatus of an embodiment.

A configuration example of an optical pickup apparatus 10 according to an embodiment of the present invention and an optical disc recording/reproducing apparatus 1 including the optical pickup apparatus 10 will be described with reference to FIGS. 1 and 2. FIG. 1 is a side view of a configuration example of the optical pickup apparatus 10 of the embodiment. FIG. 2 is a block diagram of a configuration example of the optical disc recording/reproducing apparatus 1 of the embodiment.

As illustrated in FIG. 1, the optical pickup apparatus 10 according to an embodiment of the present invention is configured to mainly include an objective lens 101 and a collimator lens (spherical aberration correction lens) 103*a*. As illustrated in FIG. 1, an optical disc 2 of the embodiment is assumed to be a so-called multilayer optical disc that includes an information recording surface of an L0 layer, and an information recording surface of an L1 layer which has a protective layer thinner than that of the L0 layer, for example.

The objective lens 101 according to an embodiment of the present invention is a lens for applying the laser beam for recording or reproducing information to the information recording surfaces of the L0 and L1 layers, selectively, of the optical disc 2 mounted on a turn table (not shown). The objective lens 101 is held by a predetermined lens holder (not shown), for example.

The collimator lens 103*a* according to an embodiment of the present invention is a lens capable of moving on a light path A between the objective lens 101 and a light source of the laser beam so as to correct spherical aberration that may occur when the objective lens 101 applies the laser beam to the information recording surface of any one layer of the optical disc 2. The collimator lens 103*a* is held by a collimator lens movement mechanism 103 including a predetermined actuator 103*b*. The collimator lens movement mechanism 103 is a well-known apparatus that drives the actuator 103*b* to move the collimator lens 103*a* to the left and right in FIG. 1 along the light path A.

The optical pickup apparatus 10 according to an embodiment of the present invention further includes a semiconductor laser 106, which is the light source of the laser beam. If the optical disc 2 is, for example, the Blu-ray Disc (registered trademark), a well-known laser apparatus capable of emitting a blue-violet laser beam with a wavelength of 400 nm to 410 nm is used as the semiconductor laser 106.

The lower portion of FIG. 1 illustrates exemplarily an optical system 100 is configured to at least include the above objective lens 101 and the collimator lens 103*a* and further include the semiconductor laser 106. In the lower portion of FIG. 1, the light path A between the objective lens 101 and the collimator lens 103*a* is shown, for simplicity, without reflection of a rising mirror 102 illustrated in the upper portion of FIG. 1. In essence, however, the light path A in the lower portion of FIG. 1 is equivalent to a light path with reflection.

On the other hand, as illustrated in the upper portion of FIG. 1, the optical pickup apparatus 10 according to an embodiment of the present invention is configured to further include a diffraction grating 105, a beam splitter 104, the rising mirror 102, a condenser lens 107, and a photodetector 108.

The diffraction grating 105 is a well-known optical component that has a function of diffracting the laser beam from the semiconductor laser 106 into, e.g., 0th order light and ±1st order diffracted lights.

The beam splitter 104 is a well-known optical component that has a function of transmitting the laser beam from the diffraction grating 105, to be incident on the collimator lens 103*a*, and a function of reflecting the reflected light of the laser beam from the optical disc 2, to be incident on the condenser lens 107.

The rising mirror 102 is a well-known optical mirror that has a function of reflecting the laser beam from the collimator lens 103*a*, to be incident on the objective lens 101, and a function of reflecting the reflected light of the laser beam from the optical disc 2, to be incident on the collimator lens 103*a*.

The condenser lens 107 is a well-known optical lens that condenses the laser beam from the beam splitter 104, to be incident on the photodetector 108.

The photodetector 108 is a well-known detecting apparatus that has, for example, a light-receiving area divided into a plurality of portions to receive each of the reflected lights of, the 0th order light and the ±1st order diffracted lights of the laser beam, from the optical disc 2. The photodetector 108 has a function of generating an electric signal photoelectrically converted depending on the light amount of the reflected light of the 0th order light, to be output to a processing circuit 202 (FIG. 2) on the subsequent stage. As a result, information is reproduced from the information recording surface in the optical disc 2, based on the electric signal corresponding to the reflected light of the 0th order light. The photodetector 108 also has a function of generating an electric signal photoelectrically converted depending on the light amount of the reflected light of the ±1st order diffracted lights, to be output to the processing circuit 202 (FIG. 2) on the subsequent stage, along with the electric signal in accordance with the reflected light of the 0th order light. As a result, a tilt error signal, a tracking error signal, a focus error signal, etc., are generated based on the electric signals in accordance with the reflected light of the 0th order light and ±1st order diffracted lights. The tilt control; the tracking control using the differential push-pull method, etc.; the focusing control using the differential astigmatic method; and the like, are thus performed by a predetermined controlling means (not shown).

<<CPU and Various Circuits>>

As shown in FIG. 2, the spherical aberration correction of the optical disc recording/reproducing apparatus 1 according to an embodiment of the present invention is generally controlled by a CPU 200.

The CPU 200 mainly has a function of driving the actuator 103*b* to move the collimator lens 103*a* by outputting a control voltage from a control circuit 204. The CPU 200 also has a function of emitting the laser beam from the semiconductor laser 106 by outputting a control voltage from a laser drive circuit 203. The CPU 200 also has a function of driving a coil (not shown) provided on the lens holder holding the objective lens 101 to perform the tracking control, etc., based on a predetermined signal generated by the processing circuit 202 from the electric signal detected by the photodetector 108.

The above control operation is performed based on a predetermined program stored in a ROM 205. On the other hand, a RAM 206 stores moving distances δ' and δ" of the collimator lens 103*a* described later, control voltage values corresponding to information such as a position of a movement destination, etc.

A collimator lens position detecting unit 201 is, for example, a well-known detecting apparatus that detects the position of the collimator lens 103*a* on the light path A based on an amount of change in the control voltage output from the control circuit 204. If the collimator lens 103*a* is moved based only on the moving distances δ' and δ", the collimator lens position detecting unit 201 is not an essential constituent element of the optical disc recording/reproducing apparatus 1.

==Operation Example of Optical Pickup Apparatus==

Figure 3:
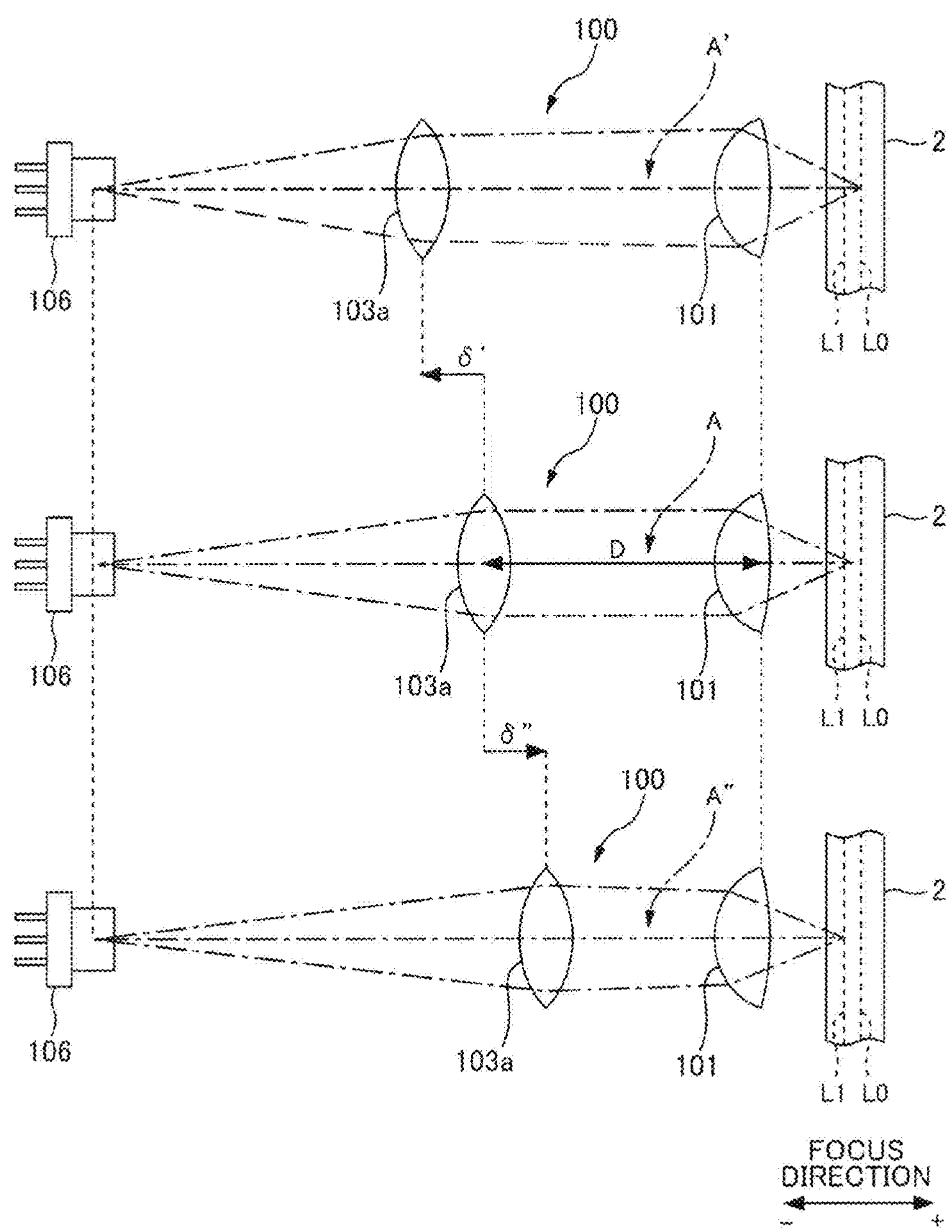
FIG. 3 is a side view of an arrangement example of a collimator lens for spherical aberration correction in an optical system of an embodiment.
Figure 4A:
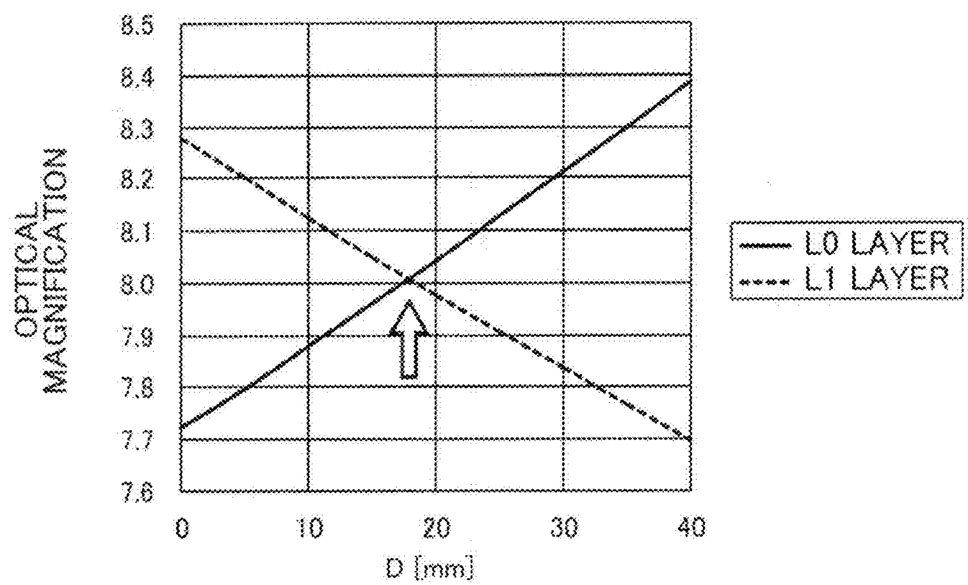
FIG. 4A is a graph of an example of correlation of a reference distance D between an objective lens and a collimator lens with optical magnification of an optical system.
Figure 4B:
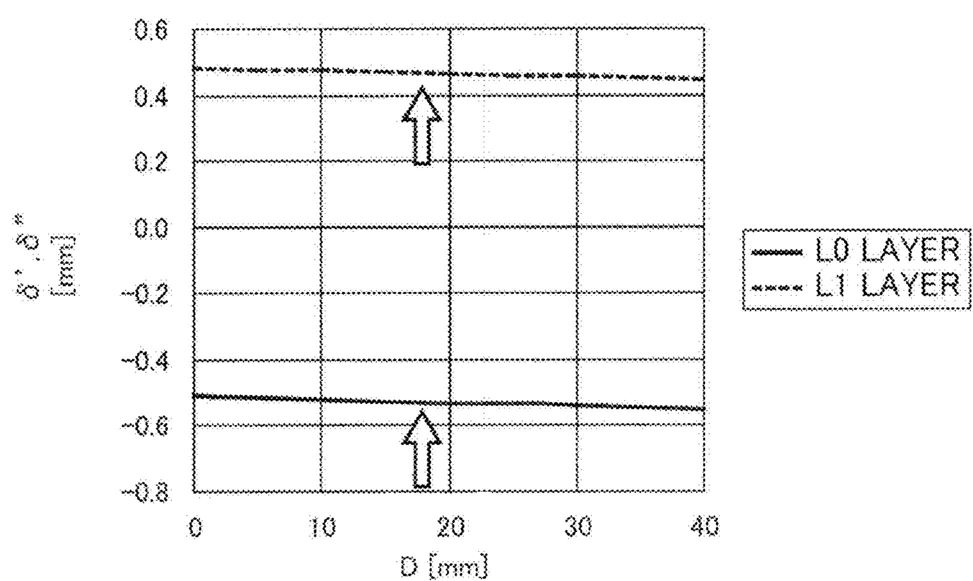
FIG. 4B is a graph of an example of correlation of a reference distance D between an objective lens and a collimator lens with moving distances δ', δ" of the collimator lens.

An operation example of the spherical aberration correction using the optical pickup apparatus 10 including the above configuration will be described with reference to FIGS. 3, 4A, and 4B. FIG. 3 is a side view of an arrangement example of the collimator lens 103*a* for the spherical aberration correction in the optical system 100 according to an embodiment of the present invention. FIG. 4A is a graph of an example of correlation of a reference distance D between the objective lens 101 and the collimator lens 103*a* with the optical magnification of the optical system 100. FIG. 4B is a graph of an example of correlation of a reference distance D between the objective lens 101 and the collimator lens 103*a* with moving distances δ' and δ" of the collimator lens 103*a*. As described above, the optical system 100 of the optical pickup apparatus 10 according to an embodiment of the present invention includes at least the objective lens 101 and the collimator lens 103*a* and further includes the semiconductor laser 106. However, the embodiment is not limited as such, and the semiconductor laser 106 is not an essential constituent element when a change in the arrangement for the optical system 100 is considered.

As illustrated in the center portion of FIG. 3, if the arrangement of the optical system 100 is set such that a parallel laser beam (parallel light) from the collimator lens 103*a* enters the objective lens 101, and such that the laser beam is focused on an intermediate virtual layer (one layer, intermediate layer) between the L0 layer (information recording surface at one end) and the L1 layer (information recording surface at the other end) of the optical disc 2, the spherical aberration becomes zero. For the purpose of generating the above parallel light, any distance may be placed between the objective lens 101 and the collimator lens 103*a*. However, in an embodiment of the present invention, a reference distance D is set such that the optical system 100 illustrated in the upper portion of FIG. 3 and the optical system 100 illustrated in the lower portion thereof have the same optical magnification. The optical magnification represents a proportion of: a size of an "image" at the focal point of the laser beam from the objective lens 101; to a size of an "object" at the emitting point of the semiconductor laser 106 in the optical system 100. To be exact, the distance between the objective lens 101 and the collimator lens 103*a* represents an interval between the front-side (collimator lens side) principal point of the objective lens 101 and the rear-side (objective lens side) principal point.

In accordance with calculations based on a model of the paraxial geometric optics theory described later, as shown in FIG. 4A, the longer the above reference distance D in the case of focusing the laser beam on the intermediate virtual layer between the L0 layer and L1 layer, is set; the greater the optical magnification in the case of moving the collimator lens 103$a$ away from the objective lens 101 by δ' to focus the laser beam on the L0 layers, shows a tendency to become. On the other hand, the longer the above reference distance D is set; the smaller the optical magnification in the case of moving the collimator lens 103$a$ closer to the objective lens 101 by δ" to focus the laser beam on the L1 layer, shows a tendency to become. Therefore, if the reference distance D is employed such that the two tendencies intersect with each other (see an arrow of FIG. 4A), the optical magnification when focusing the laser beam on the L0 layer as illustrated in the upper portion of FIG. 3 becomes equal to the optical magnification when focusing the laser beam on the L1 layer as illustrated in the lower portion of FIG. 3.

With regard to the calculation conditions by which the graph of FIG. 4A is given: a thickness difference between the protective layer of the L0 layer and the protective layer of the L1 layer is 25 μm; a focal distance $f_o$ of the objective lens 101 is 2 mm; a numerical aperture NA is 0.85; and a focal distance $f_c$ of the collimator lens 103$a$ is 16 mm. As shown in FIG. 4A, if the reference distance D is about 18 mm, the above two optical magnifications are about 8.0 and equal to each other. In the calculation result shown in FIG. 4B, if the reference distance D is about 18 mm, the absolute value of the above δ' is defined as about 0.5 mm and the absolute value of the above δ" is defined as about 0.5 mm.

In the optical pickup apparatus 10 according to an embodiment of the present invention, if the distance between the objective lens 101 and the collimator lens 103$a$ is adapted to be variable in a range between D-δ" and D-δ' (where δ'<0 and δ">0) based on the reference distance D and the moving distances δ', δ" both defined in advance with theoretical calculations, the spherical aberration can be corrected while the optical magnification being maintained at a constant value when the laser beam is focused on each information recording surface of two layers (L0 layer and L1 layer). Specifically, this may be realized for example by: storing control voltage values, etc., corresponding to the moving distances δ', δ" in the RAM 206 in advance; and driving the actuator 103$b$ in accordance with these control voltages to move the collimator lens 103$a$ when switching between the focusing on the L0 layer and the focusing on the L1 layer.

<<Paraxial Geometric Optics Theory>>

Figure 5:
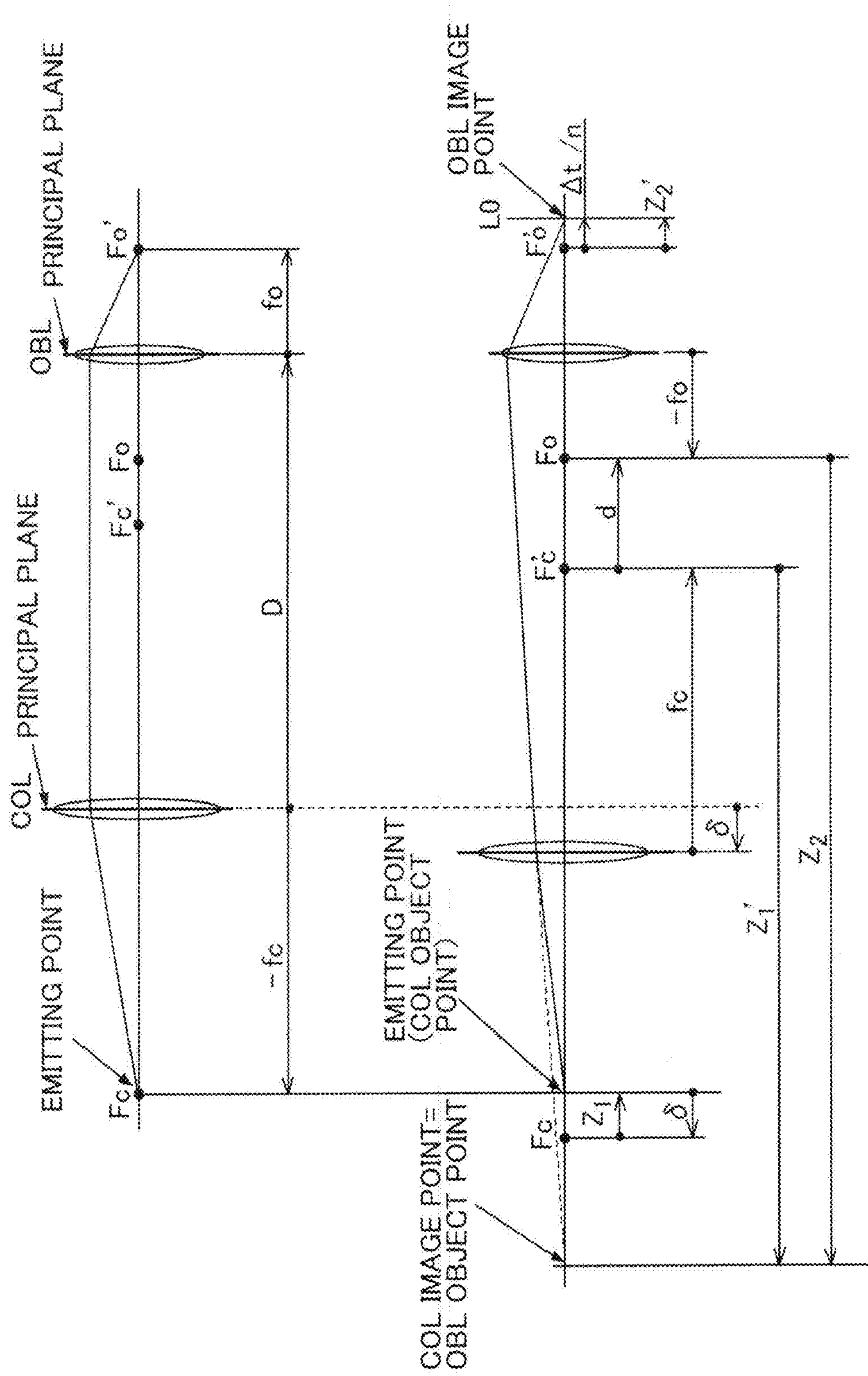
FIG. 5 is a schematic view of an arrangement of an optical system model in the case of focusing light on an intermediate layer between L0 and L1 layers and an arrangement of an optical system model in the case of focusing light on the L0 layer.

The model of the paraxial geometric optics theory by which the tendencies of the graphs shown in FIGS. 4A and 4B are given will be described with reference to FIG. 5. FIG. 5 is a schematic view of an arrangement of an optical system model in the case of focusing light on the intermediate layer between the L0 layer and L1 layer, and an arrangement of an optical system model in the case of focusing light on the L0 layer.

As a premise of calculations, thin lenses are used for an objective lens OBL (corresponding to the above objective lens 101) and a collimator lens COL (corresponding to the above collimator lens 103$a$) that the optical system is configured with. It is assumed that the spherical aberration caused by the thickness difference (Δt×2) of the protective layers of the layers (L0 layer and L1 layer) is ignored due to paraxial approximation. It is also assumed that the moving distance of the collimator lens COL is set such that a moving distance of an image point of the objective lens OBL corresponds to Δt, where the moving distance of the collimator lens COL is a distance: from a position in the case of focusing the light on the intermediate layer between the L0 layer and L1 layer (in the upper portion of FIG. 5); to a position in the case of focusing the light on the L0 layer (in the lower portion of FIG. 5). With regard to each distance described below, it is assumed that a direction from an emitting point (corresponding to the emitting point of the above semiconductor laser 106) to the objective lens OBL is positive.

Based on a so-called Newton's formula relating to image formation, the following "equation 1" and "equation 2" are formulated.

$$Z_1 \cdot Z_1' = -f_c^2 \tag{1}$$

$$Z_2 \cdot Z_2' = -f_0^2 \tag{2}$$

As shown in the lower portion of FIG. 5, $Z_1$ is a distance, the direction thereof being opposite to the moving distance δ of the collimator lens COL, and the absolute value thereof being equal to the moving distance δ; $Z_1'$ is a distance from a rear-side focal point $F_c'$ of the collimator lens COL to an image point of the collimator lens COL (i.e., an object point of the objective lens OBL); and $f_c$ is a distance from a principal plane of the collimator lens COL to the rear-side focal point $F_c'$. As shown in the lower portion of FIG. 5, $Z_2$ is a distance from a front-side focal point $F_o$ of the objective lens OBL to the object point of the objective lens OBL (i.e., the image point of the collimator lens COL); $Z_2'$ is a distance from a rear-side focal point $F_o'$ of the objective lens OBL to an image point of the objective lens OBL (i.e., a position of the L0 layer); and $f_0$ is a distance, the direction of which is opposite to and the absolute value of which is equal to the distance from a principal plane of the objective lens OBL to the front-side focal point $F_o$.

Based on "equation 1" and "equation 2", the lateral magnification $\beta_{L0}$ of an image point side of the objective lens OBL relative to an emitting point side shown in the lower portion of FIG. 5 can be expressed by the following "equation 3".

$$\beta_{L0} = \frac{f_c}{f_o}\frac{\Delta t}{n\delta_{L0}} \tag{3}$$

In this equation, n represents a refractive index of the protective layer, and $\delta_{L0}$ represents a moving distance of the collimator lens COL from a position in the case of focusing light on the intermediate layer between the L0 layer and L1 layer to a position in the case of focusing light on the L0 layer, which is expressed by the following "equation 4".

$$\delta_{L0} = \frac{1}{2}\left[-\left(f_o + f_c - D + \frac{n}{\Delta t}f_o^2\right) + \sqrt{\left(f_o + f_c - D + \frac{n}{\Delta t}f_o^2\right)^2 - 4f_c^2}\right] \tag{4}$$

In this equation, D represents a reference distance from the principal plane of the collimator lens COL to the principal plane of the objective lens OBL.

Similarly, the lateral magnification $\beta_{L1}$ of the image point side of the objective lens OBL relative to the emitting point side in the case of focusing light on the L1 layer (not shown) can be expressed by the following "equation 5".

$$\beta_{L1} = -\frac{f_c}{f_0}\frac{\Delta t}{n\delta_{L1}} \tag{5}$$

In this equation, $\delta_{L1}$ represents a moving distance of the collimator lens COL from a position in the case of focusing light on the intermediate layer between the L0 layer and L1 layer to a position in the case of focusing light on the L1 layer, which is expressed by the following "equation 6".

$$\delta_{L1} = \frac{1}{2}\left[-\left(f_o + f_c - D - \frac{n}{\Delta t}f_o^2\right) - \sqrt{\left(f_o + f_c - D - \frac{n}{\Delta t}f_o^2\right)^2 - 4f_c^2}\right] \quad (6)$$

The reference distance D at which the optical magnification for light focused on the L0 layer is equal to the optical magnification for light focused on the L1 layer, is given as a solution to an equation which is obtained assuming that $\beta_{L0}$ of "equation 3" is equal to $\beta_{L1}$ of "equation 5". By solving this equation, the reference distance D can be given as the following "equation 7".

$$D=f_0+f_c \quad (7)$$

As above, the reference distance D at which the optical magnification for light focused on the L0 layer is equal to the optical magnification for light focused on the L1 layer, is equal to a sum of the focal distance $f_o$ of the objective lens OBL and the focal distance $f_c$ of the collimator lens COL.

==Optical Pickup Apparatus with Constant Optical Magnification==

In the optical pickup apparatus 10 (FIG. 1) including the above configuration, if the reference distance D between the objective lens 101 and the collimator lens 103*a* is set to be equal to a sum of the focal distance $f_o$ of the objective lens 101 and the focal distance $f_c$ of the collimator lens 103*a*, the optical magnification for light focused on the L0 layer of the optical disc 2 becomes equal to the optical magnification for light focused on the L1 layer of the optical disc 2, regardless of a movement of the collimator lens 103*a*.

The rim intensities of the laser beams become equal to each other, since their respective optical magnifications are equal to each other, where the rim intensity determines: the spot shape of the laser beam at the focal point; and optical coupling efficiency (e.g., a ratio of an amount of light incident on the objective lens 101 out of an amount of light emitted from the semiconductor laser 106) of the laser beam; and the like, regardless of the movement of the collimator lens 103*a*. The rim intensity represents sharpness of intensity distribution on the cross section orthogonal to the light axis direction of the laser beam (e.g., sharpness increases as the rim intensity decreases). The characteristics of recording or reproducing information become equal because of the equal rim intensities, between the L0 layer and L1 layer and, therefore, no special configurations for accommodating the characteristic differences are not necessary in the processing circuit 202 (FIG. 2) for recording or reproducing information, the firmware stored in the ROM 205, etc., of the optical pickup apparatus 10. As the configurations for accommodating the characteristic differences are unnecessary, the optical pickup apparatus 10 is simplified and also the cost thereof can be reduced, accordingly.

The intervals among the three spots of the above mentioned 0th order light and ±1 st order diffracted lights when the differential push-pull method is performed, become the same because of the equal magnifications, between the L0 layer and the L1 layer. Therefore, the tracking control is stabilized since the amplitude of the tracking error signal is less varied between the two layers, for example.

From the above description, a low-cost optical pickup apparatus 10 is provided, which is capable of performing easily spherical aberration correction while maintaining characteristics of information recording or reproducing and stability of the tracking control substantially constant, for each of the two layers (L0 and L1 layers) of information recording surfaces in the optical disc 2.

==Case of Optical Disc Including Three or More Layers of Information Recording Surfaces==

Since the above "equation 7" does not include the parameter Δt related to the thickness difference between the L0 layer and L1 layer, the optical pickup apparatus 10 including the above configuration is able to have a similar effect on the optical discs 2' and 2" including three or more layers of information recording surfaces, to that on the optical disc including two layers of information recording surfaces described above.

<<Case of Three Layers>>

Figure 6:
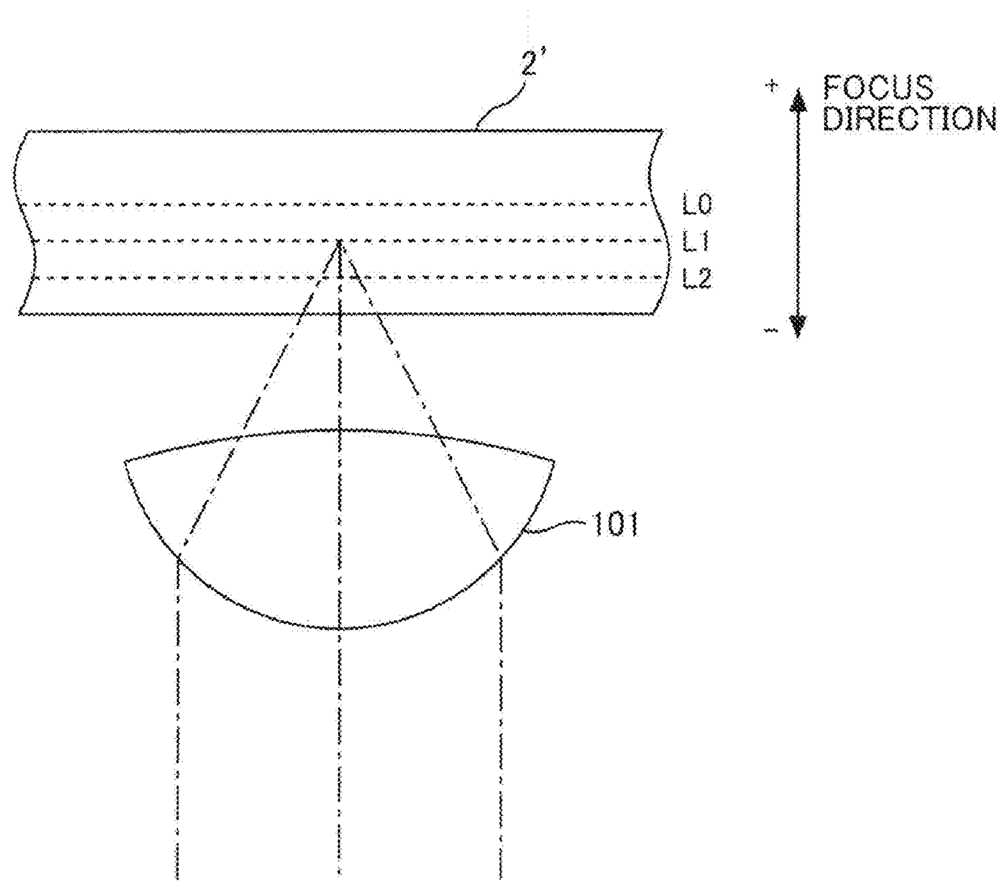
FIG. 6 is a side view of an arrangement example of a three-layered optical disc and an objective lens of an optical pickup apparatus of an embodiment.

As illustrated in FIG. 6, regarding the optical disc 2' including three layers (L0, L1, and L2 layers) of information recording surfaces, where the differences in thickness between protective layers of adjacent layers are substantially the same, the reference distance D may be set at a sum of the focal distance $f_o$ and the focal distance $f_c$, assuming that the L1 layer corresponds to the intermediate layer in the above mentioned two-layer case. FIG. 6 is a side view of an arrangement example of the three-layered optical disc 2' and the objective lens 101 of the optical pickup apparatus 10 according to an embodiment of the present invention. In this case, the L0 layer and L2 layer correspond to information recording surfaces at one end and the other end, and the L1 layer corresponds to one layer between two information recording surfaces or to an intermediate layer between two information recording surfaces.

As a result, the optical magnification in the case of correcting spherical aberration on the L0 layer can be made equal to that on the L2 layer and, at the same time, these optical magnifications can be made substantially equal to that on the L1 layer.

From the above description, the low-cost optical pickup apparatus 10 is provided, which is capable of performing easily the spherical aberration correction while maintaining characteristics of information recording or reproducing and stability of the tracking control substantially constant, for each of the three layers (L0, L1, and L2 layers) of information recording surfaces in the optical disc 2'.

<<Case of Four Layers>>

Figure 7A:
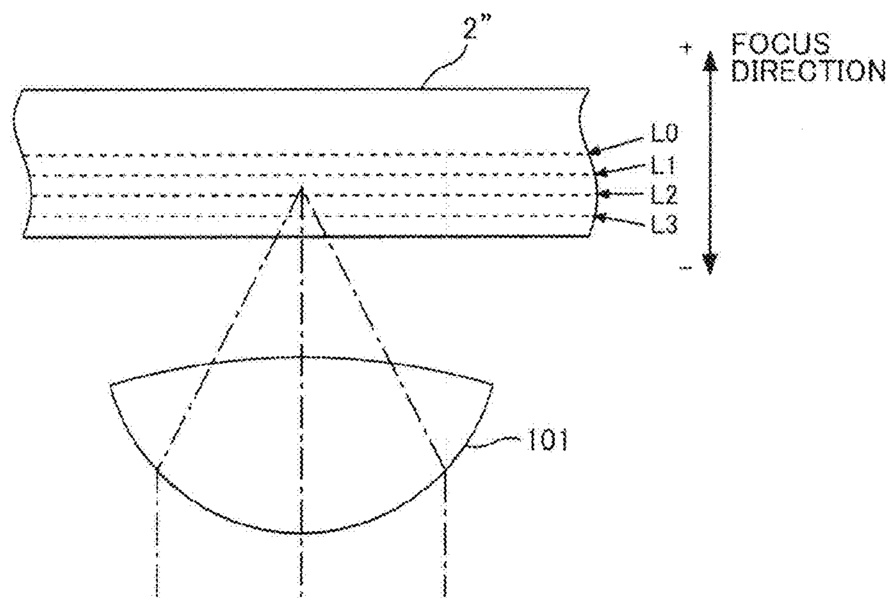
FIG. 7A is a side view of an arrangement example of a four-layered optical disc and an objective lens of an optical pickup apparatus of an embodiment.

As illustrated in FIG. 7A, regarding the optical disc 2" including four layers (L0, L1, L2, and L3 layers) of information recording surfaces, where the differences in thickness between protective layers of adjacent layers are substantially the same, the reference distance D may be set at a sum of the focal distance $f_o$ and the focal distance $f_c$, assuming that an intermediate virtual layer between the L1 layer and L2 layer corresponds to the intermediate layer in the above mentioned two-layer case. FIG. 7A is a side view of an arrangement example of the four-layered optical disc 2" and the objective lens 101 of the optical pickup apparatus 10 according to an embodiment of the present invention. In this case, the L0 layer and L3 layer correspond to information recording surfaces at one end and the other end, and the virtual layer corresponds to one layer between two information recording surfaces or an intermediate layer between two information recording surfaces.

Figure 7B:
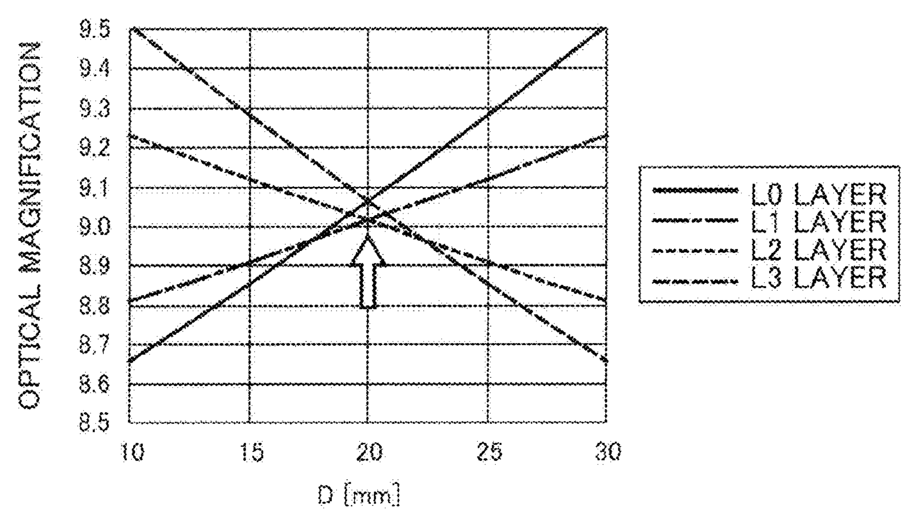
FIG. 7B is a graph of an example of correlation of a reference distance D between an objective lens and a collimator lens with an optical magnification of an optical system.

In accordance with the calculations based on the model of the paraxial geometric optics theory described before, as shown in FIG. 7B, the longer the reference distance D is set; the greater the optical magnification in the case of moving the collimator lens 103*a* away from the objective lens 101 to focus the laser beam on the L0 layer, shows a tendency to become. On the other hand, the longer the above reference distance D is set; the smaller the optical magnification in the case of moving the collimator lens 103*a* closer to the objective lens 101 to focus the laser beam on the L3 layer, shows a tendency to become. In the example of FIG. 7B, these two tendencies intersect with each other when the reference distance D is 20 mm. FIG. 7B is a graph showing an example of correlation of a reference distance D between the objective lens 101 and the collimator lens 103*a* with the optical magnification of the optical system 100.

Similarly, the longer the reference distance D is set; the greater the optical magnification in the case of moving the collimator lens 103*a* away from the objective lens 101 to focus the laser beam on the L1 layer, shows a tendency to become. On the other hand, the longer the above reference distance D is set; the smaller the optical magnification in the case of moving the collimator lens 103*a* closer to the objective lens 101 to focus the laser beam on the L2 layer, shows a tendency to become. In the example of FIG. 7B, these two tendencies intersect with each other when the reference distance D also is 20 mm, which is the same as the above.

From the above description, the optical magnification in the case of correcting spherical aberration on the L0 layer can be made equal to that on the L3 layer (optical magnification A); the optical magnification in the case of correcting spherical aberration on the L1 layer can be made equal to that on the L2 layer (optical magnification B); and the optical magnification A and the optical magnification B can be made substantially equal to each other.

With regard to the calculation conditions by which the graph of FIG. 7B is given: the thickness difference between the protective layers of adjacent layers is 15 μm; the focal distance $f_o$ of the objective lens 101 is 2 mm; the numerical aperture NA is 0.85; and the focal distance $f_c$ of the collimator lens 103*a* is 18 mm.

From the above description, the low-cost optical pickup apparatus 10 is provided, which is capable of performing easily the spherical aberration correction while maintaining characteristics of information recording or reproducing and stability of the tracking control substantially constant, for each of the four layers (L0, L1, L2, and L3 layers) of information recording surfaces in the optical disc 2".

==Beam Expander==

Although the spherical aberration correction lens is the collimator lens 103*a* in the above embodiment, this is not limited as such. For example, a beam expander (not shown) may be used for the spherical aberration correction. The beam expander is a lens configured with a fixed lens (not shown) and a movable lens (not shown) the position of which can be changed in the light axis direction relative to the fixed lens, and is disposed between an objective lens (similar to the above objective lens 101) and a fixed collimator lens (similar to the above collimator lens 103*a*). In this case, the spherical aberration correction lens is regarded as a lens system configured with a total of three lenses, which are the fixed lens, the movable lens, and the fixed collimator lens, and the distance between the spherical aberration correction lens and the objective lens is regarded as the distance between the movable lens and the objective lens. In this way, as is the case of the above collimator lens 103*a*, by setting the reference distance between the spherical aberration correction lens and the objective lens to a predetermined value, it becomes possible to correct the spherical aberration while maintaining the optical magnification substantially constant, for each of a plurality of layers of information recording surfaces on which the laser beam is focused in the optical disc. The predetermined value is equal to a sum of: the composite focal distance of the spherical aberration correction lens, i.e., the lens system configured with a total of three lenses, which are the fixed lens, the movable lens, and the fixed collimator lens; and the focal distance of the objective lens.

In the above embodiment, the reference distance D is set for: (1) the intermediate virtual layer between the L0 layer and L1 layer (FIG. 3); (2) the intermediate L1 layer among the L0, L1, and L2 layers (FIG. 6); or (3) the intermediate virtual layer of the L0, L1, L2, and L3 layers (FIG. 7A), where the laser beam in parallel between the spherical aberration correction lens and the objective lens is focused on each of the above intermediate (or intermediate virtual) layers; nevertheless, the embodiment is not limited as such.

The laser beam between the spherical aberration correction lens and the objective lens by which the reference distance D is given may not be parallel, for example. The position of the focal point by which the reference distance D is given may be any one layer between the information recording surface at one end and the information recording surface at the other end, for example. This layer represents: any virtual layer between the L0 layer and L1 layer in the above case (1); any virtual layer between the L0 layer and L2 layer, or the L1 layer, in the above case (2); and any virtual layer between the L0 and L3 layers, or the L1 or L2 layer, in the above case (3).

For example, if the reference distance D is obtained by use of the above paraxial geometric optics theory when the non-parallel laser beam is focused on any one layer described above, the distance on the light path between the spherical aberration correction lens and the objective lens at the time of focusing the laser beam on another layer, is a distance obtained by adding or subtracting the moving distance, corresponding to the above moving distance δ' or δ", etc., to or from the reference distance D. By limiting the movement width of the spherical aberration correction lens to a smaller range in this manner, the spherical aberration correction can efficiently be performed.

The above embodiments of the present invention are merely for the purpose of facilitating the understanding of the present invention and are not intended to limit the interpretation of the present invention. The present invention may variously be changed/altered without departing from the spirit thereof and the present invention encompasses the equivalents thereof.

What is claimed is:

1. An optical pickup apparatus comprising:

an objective lens configured to apply a laser beam for recording or reproducing information to a plurality of layers of information recording surfaces selectively, the plurality of layers of information recording surfaces being included in an optical disc mounted on a turn table; and a spherical aberration correction lens configured to be movable on a light path on the side where the laser beam is incident on the objective lens, so as to correct spherical aberration when the laser beam is applied from the objective lens to any one of the plurality of information recording surfaces in the optical disc, a distance between the spherical aberration correction lens and the objective lens on each light path when the laser beam is focused on each of the plurality of layers of information recording surfaces in the optical disc with movement of the spherical aberration correction lens, including a distance at which optical magnification of an optical system including the spherical aberration correction lens and the objective lens is maintained substantially constant.

2. The optical pickup apparatus of claim 1, wherein a reference distance is defined as a distance between the spherical aberration correction lens and the objective lens on a light path when the laser beam is focused on one layer between the information recording surface at one end and the information recording surface at the other end, in the optical disc, and wherein a distance between the spherical aberration correction lens and the objective lens on each light path when the laser beam is focused on each of the plurality of layers of information recording surfaces in the optical disc, includes a distance obtained by adding or subtracting: a distance corresponding to an information recording surface on which the laser beam should be focused among the plurality of layers of information recording surfaces; to or from the reference distance.

3. The optical pickup apparatus of claim 2, wherein the reference distance includes a distance between the spherical aberration correction lens and the objective lens on a light path when the laser beam incident in parallel on the objective lens from the spherical aberration correction lens is focused on an intermediate layer between the information recording surface at one end and the information recording surface at the other end.

4. The optical pickup apparatus of claim 3, wherein the reference distance includes a distance of a sum of the focal distance of the spherical aberration correction lens and the focal distance of the objective lens.

5. The optical pickup apparatus of claim 4, wherein the spherical aberration correction lens includes a collimator lens.

6. The optical pickup apparatus of claim 3, wherein the spherical aberration correction lens includes a collimator lens.

7. The optical pickup apparatus of claim 2, wherein the spherical aberration correction lens includes a collimator lens.

8. The optical pickup apparatus of claim 1, wherein the spherical aberration correction lens includes a collimator lens.

* * * * *